UNITED STATES PATENT OFFICE.

JOHN M. WEISS, OF NEW YORK, N. Y., AND CHARLES R. DOWNS, OF CLIFFSIDE, NEW JERSEY, ASSIGNORS TO THE BARRETT COMPANY, A CORPORATION OF NEW JERSEY.

CATALYTIC OXIDATION OF FLUORENE.

1,374,695.  Specification of Letters Patent.  Patented Apr. 12, 1921.

No Drawing.   Application filed November 21, 1919. Serial No. 339,699.

*To all whom it may concern:*

Be it known that we, (1) JOHN M. WEISS and (2) CHARLES R. DOWNS, citizens of the United States, residing at (1) 210 West 110th St., New York city, and (2) Cliffside, in the counties of (1) New York and (2) Bergen, and States of (1) New York and (2) New Jersey, have invented certain new and useful Improvements in Catalytic Oxidation of Fluorene, of which the following is a specification.

This invention relates to the catalytic oxidation of fluorene or diphenylenemethane and to the production of a product of partial oxidation therefrom. It comprises the partial or selective oxidation of fluorene by oxygen either alone or mixed with diluents or by means of an oxygen-containing gas in the presence of a catalyzer to form fluorenone or diphenyleneketone.

The invention is based upon the discovery that by subjecting fluorene, $C_{13}H_{10}$, to oxidation in the presence of an appropriate catalyzer, and at an appropriate temperature, a selective or partial oxidation thereof takes place with the formation of an oxidation product known as a ketone. We have found that under proper conditions the fluorene may be changed to fluorenone without effecting the complete combustion of a very large proportion of the material treated. The invention may be practised by subjecting the fluorene in the vapor phase mixed with air or with oxygen either alone or admixed with other diluent gases, or with certain oxygen containing gases, to a suitable temperature in the presence of certain catalyzers. It has been found that many oxids of metals are suitable for this purpose. More especially vanadium compounds, and more particularly the oxids of vanadium have been found to 'be especially useful as catalyzers in this process.

By suitably regulating the conditions such as temperature, pressure and presence of diluents and operating with proper catalysts so that these conditions bear fixed relations to each other within wide limits, the degree of oxidation can be controlled whereby the fluorene is oxidized in a particular manner to an extent short of what is commonly known as complete combustion, to produce fluorenone.

The invention will be explained in connection with the following example, which is given for illustrative purposes. It is not intended to limit the procedure to the exact details given as the process can be varied throughout wide limits without departing from the spirit and scope of the invention.

A mixture of fluorene and air in the vapor phase is passed through tubes at a temperature of about 300° C. to 700° C., the tubes containing vanadium oxid deposited on crushed pumice with the result that fluorenone is produced. Instead of introducing oxygen as oxygen of the air, oxygen gas may be used either alone or diluted with nitrogen or other inert gas; the proportion of oxygen to fluorene may be varied; the catalyzer may be deposited on crushed pumice or other suitable powdered, granulated or fibrous material, which is chemically inactive and acts merely as a mechanical distributer; the rate at which the mixture is passed through the tubes may be regulated to suit the needs; the tubes may be varied in length or diameter, or confined spaces other than tubes may be used in which to place the catalyzer; instead of vanadium oxid, other compounds may be used as a catalyzer. It is essential that hot fluorene in the vapor phase shall come in contact with the catalyzer in the presence of oxygen for the proper reaction to take place. The introduction of a diluent gas is a convenient way to assist in regulation of the reaction. It has been found that the pressure may be varied throughout quite wide ranges, say very slightly below atmospheric up to considerably above atmospheric pressure with satisfactory results.

Theoretical considerations point to one molecule of fluorene to two atoms of oxygen as the proper proportions to produce fluorenone from fluorene. The following equation is suggested as representing the reaction which takes place, though it is not desired to limit the reaction to any particular theory. The equation is given to explain the reaction as indicated by the results obtained.

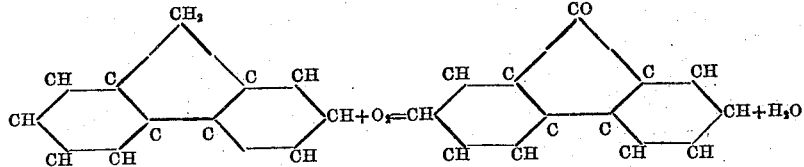

Where a considerable excess of fluorene is used over and above that which is oxidized, the remaining fluorene will in part pass through practically unchanged, and the reaction gases will be correspondingly diluted by the excess fluorene present during the reaction. The nitrogen of the air will have a corresponding diluent effect. Any steam if present, will similarly have a diluent effect, for example, in case moist air, instead of dry air, is used in the process of the above specific example. Since water is practically always formed as a product some steam is present as a consequence.

The fluorene used should preferably be of high purity, or, if admixed with impurities, it should be substantially free from impurities of such a character as would prejudice the desired selective and partial catalytic oxidation.

It will be evident that various types of apparatus may be used for carrying out the process of the present invention and for bringing about the necessary contact of the reacting gases with the catalyst and for maintaining the proper temperature for the catalytic reaction. Accordingly, we do not deem it necessary to describe in further detail such types of apparatus.

It will be evident also that the various conditions of the reaction are capable of variation. Among these conditions may be mentioned the temperature and pressure at which the reaction is carried out, the time of contact of the reactive gases with the catalyst, the proportion of catalyst to the reacting gases, and the relative proportions of fluorene and oxygen and of diluent gases, such as nitrogen. The reaction may thus be carried out at atmospheric pressure, or at increased or diminished pressures. The oxidizing effect can be modified by further diluting the reacting gases, as by returning the air, impoverished in oxygen by the reaction, to dilute the reacting gases in the further carrying out of the process, or by mixing oxygen with the air to increase the oxygen content thereof, or by using oxygen alone without other diluent, or by using oxygen in admixture with other gases than those contained in air, etc.

It will be evident also that the time of contact of the reacting gases with the catalyst can be varied by increasing the catalytic mass or by decreasing the speed at which the reacting gases pass through or in contact with the catalyst. These and like variations will correspondingly modify and affect the catalytic oxidation.

Fluorenone is apparently an intermediate product of the incomplete oxidation of fluorene. In the operation of this process under proper conditions, there has been found to be very little complete combustion, thus indicating that practically all of the fluorene which is oxidized is changed to fluorenone. Any of the fluorene which passes through the process unchanged may be separated from the other products by sublimation, crystallization, distillation, etc., and may be again passed through the reaction zone mixed with oxygen or mixed with a fresh supply of fluorene and oxygen, if desired, when more of it will be oxidized.

We claim:

1. The method of producing fluorenone which comprises oxidizing fluorene in the vapor phase at a temperature from about 300° C. to 700° C. with an oxygen containing gas in the presence of a metallic oxid as a catalyst.

2. The method of producing fluorenone which comprises oxidizing fluorene in the vapor phase at a temperature of about 300° C. to 700° C. with an oxygen containing gas in the presence of vanadium oxid as a catalyst.

In testimony whereof we affix our signatures.

JOHN M. WEISS.
CHARLES R. DOWNS.